United States Patent Office 3,057,666
Patented Oct. 9, 1962

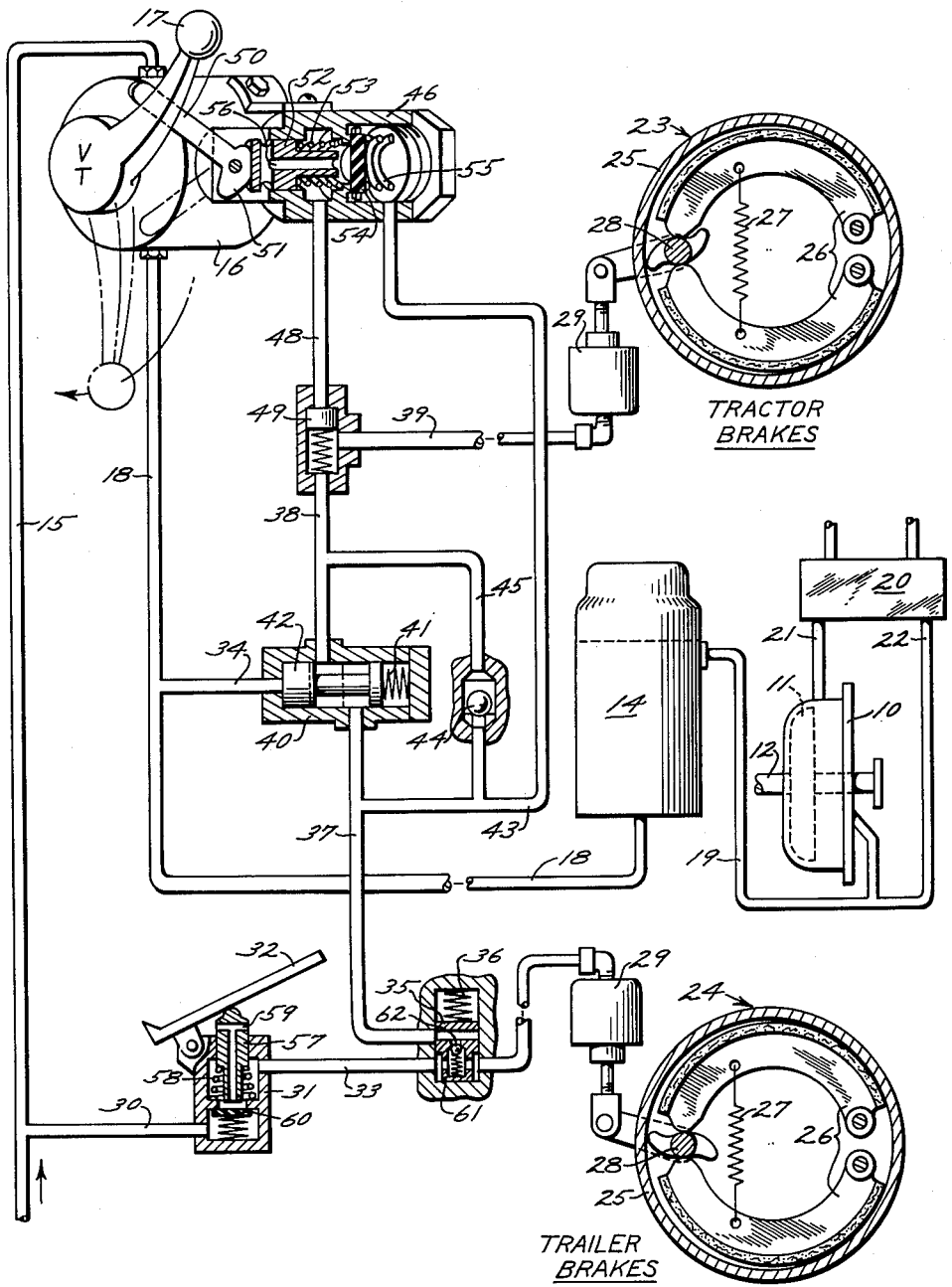

3,057,666
BRAKE CONTROL FOR TRACTOR TRAILER COMBINATIONS WITH RETARDER SYSTEMS
Alfred W. Sieving, Decatur, and David R. Greer, Washington, Ill., assignors to Caterpillar Tractor Co., Peoria, Ill., a corporation of California
Filed Apr. 11, 1961, Ser. No. 102,307
5 Claims. (Cl. 303—8)

This invention relates to braking of tractor trailer combinations and particularly to the correction of difficulties which arise from the application of greater braking force at the tractor wheels than at the trailer wheels.

It is common practice in heavy duty tractor trailer equipment to provide brakes on the wheels of both units and to take care that the tractor brakes are not applied first nor more forcibly than the trailer brakes so that the inertia of the trailer will not tend to cause it to overtake the tractor resulting in "jack knifing" or skidding the tratcor wheels to one side with a consequent loss of directional control.

This problem is complicated by the use of various retarding devices employed to supplement the brakes of tractors because the retarder is effective to reduce the tractor speed but not the trailer speed. Consequently, with the retarder in use, the usual application of the tractor and trailer brakes results in more effective braking of the tractor accompanied by the hazards referred to above.

It is, therefore, the object of this invention to provide an improved brake control system for tractor trailer combinations which include a retarder in which application of trailer brakes slightly before application of tractor brakes is insured and wherein the tractor brakes cannot be applied when the retarder is in service unless and until the trailer brakes have been applied.

Another object of the invention is to provide in such a system a normally closed bypass to the tractor brakes which is established upon operation of the retarder to permit use of the brakes in emergencies and which is automatically cut out of the system when the retarder is taken out of service.

Further and more specific objects and advantages of the invention are made apparent in the following specification wherein the invention is described in detail by reference to the accompanying drawing.

The drawing is a schematic view of a tractor trailer brake and retarder circuit embodying the present invention.

The retarder system schematically illustrated in the drawing is of a known type and comprises a rotary fluid retarder 10 with a rotor 11 secured for example to the drive shaft 12 of a vehicle and adapted to retard the speed of the drive shaft by the introduction of oil under pressure into the housing between the rotor and a stator, not shown. Such a retarder is illustrated in detail in the copending application of Alfred W. Sieving, Serial No. 101,230, filed April 6, 1961. Oil to be introduced into the retarder 10 is contained in a reservoir and pressure cylinder 14. Air pressure for accomplishing this is introduced through a line 15 in communication with a suitable source of compressed air and controlled by a throttling valve 16 and a control lever 17 thereof. As the valve is opened, air under pressure is delivered through a line 18 to the reservoir 14 and forces oil therefrom and through a line 19 to the retarder 10. The speed of the shaft 12 is retarded to a degree determined by the pressure of oil in the retarder. The retarder circulates the oil through a heat exchanger 20 to dissipate the heat of friction by means of connecting lines 21 and 22. The brakes of the tractor are represented by the single brake generally indicated at 23 and the brakes of the trailer are represented by the single brake 24. The brakes comprise rotatable drums 25 and pairs of brake shoes 26 pivotally supported and adapted to be urged outwardly against the tension of the springs represented at 27 and into frictional contact with the inner surface of the drums by a cam device 28 actuated in a conventional manner by a rotochamber 29 so that air under pressure to either rotochamber or set of rotochambers will apply the brakes on the tractor or on the trailer as the case may be.

Under ordinary operating conditions when the retarder 10 is not in use, air from a line 30 in communication with the supply line 15 is controlled as by a pedal actuated valve 31 which upon depression of its pedal 32 will admit air to a line 33 and thence to the rotochamber of the trailer brakes 24. Interposed in the line 33 is a delay valve with a sliding element 35 urged by a spring 36 to the position shown which blocks the entry of air into a line 37 and lines 38 and 39 by means of which it is conducted to the rotochamber of the tractor brakes 23. The force of the spring 36 is overcome by a few pounds pressure and it serves to prevent application of the tractor brakes until just after application of the trailer brakes so that the trailer does not tend to overtake the tractor.

If the tractor and trailer brakes are applied while the retarder is in use, bearing in mind that the retarder tends to reduce the speed of the tractor but not the trailer, the combined braking and retarding effect on the tractor will exceed that of the braking effect on the trailer again with the resulting tendency of the trailer to overtake the tractor. To avoid this, the tractor brakes are rendered inoperable by application of pressure to the retarder at least through the operation of the pedal actuated valve 31 though they may be operated by a bypass control in the manner presently to be described.

To render the brakes inoperative through pedal actuation when the throttling valve is opened as by its lever 17 being swung to the broken line position shown, the pressure of air in the line 18 will act through a line 34 to move a spool 42 of a valve 40 against the pressure of a biasing spring 41 to a position where it blocks communication of air between lines 37 and 38 thus to prevent actuation of the tractor brakes. Meanwhile upon opening of the pedal actuated valve 31 to apply the trailer brakes and to open valve 35, air will be admitted to a bypass line 43 closing a check valve 44 in a line 45 and directing pressure to a bypass brake control valve 46. The valve 46 is intended to be opened only when the retarder and trailer brakes are both in use and still further braking capacity is required. Opening of the bypass valves directs pressure through a line 48 to open a spring biased check valve 49 and thence through the line 39 to the rotochamber of the tractor brakes. The bypass control valve 46 is opened by a lever 50 which is swung downwardly to the dotted line position shown so that a cam 51 thereon depresses a plunger 52 against the biasing effect of the spring 53 and the plunger engages and unseats a valve element 54 which is normally retained in its seated position as by a spring 55. This also closes normally open vent passages 56 in the plunger and, assuming that the trailer brakes have been applied so that the valve 35 is in its open position, pressure will be communicated to the tractor brakes in the manner previously described.

The retarder valve 16 and the brake bypass valve 46 are both under control of the operator and it would be undesirable for the operator to close the retarder valve without closing the bypass valve. This is true partially because subsequent actuation of the retarder might find the tractor brakes applied through the bypass circuit again producing too much braking effect on the tractor. To avoid this, the bypass valve 46 is so disposed with relation to the retarder valve 16 that closing of the retarder valve causes the lever 17 to engage the control lever 50 of the bypass valve and move it to its closed position as shown in full lines.

Quick bleeding of pressure from all of the brakes through any of the circuits is accomplished as follows. When the pedal actuated valve is closed to release the pressure at the trailer brakes and tractor brakes, a plunger 57 thereof, held in its closed position by a spring 58, is vented to atmosphere through passages 59. These vents are closed when the plunger is depressed to move the main valve element 60 away from its seat. This releases air from the rotochamber of the trailer brakes around a stem portion 61 of the valve element 35. This stem portion contains a spring closed check valve 62 which relieves pressure from the rotochamber of the tractor brakes by way of lines 39, 38, 37, 33 and the vent of the pedal actuated valve. Ball check valve 44 is also vented and permitted to open through valves 35 and 31 when the latter is in its closed position.

With the construction herein described, the tractor brakes are, for safety purposes, incapable of operation by the usual pedal actuated valve when the retarder is in operation. They may, however, be actuated for emergency purposes by a separate hand actuated valve and this valve, also for safety purposes, is automatically moved to its closed position when operation of the retarder is discontinued.

The term trailer is used herein in its broader sense, as the invention is applicable to tractors drawing earth moving scrapers or other equipment having brakes which augment the brakes of the tractor.

We claim:

1. In a tractor trailer combination wherein the tractor and trailer have fluid actuated brakes and the tractor has a fluid controlled retarder, a source of fluid under pressure, circuits for communicating pressure from the source to the tractor brakes and trailer brakes, a single valve controlling both said circuits, a bypass circuit leading to the tractor brakes from a point downstream of said single valve, a bypass valve controlling said circuit, and means operable by pressure of fluid admitted to activate the retarder to close the first circuit to the tractor brakes whereby the tractor brakes can be applied only with the bypass valve.

2. The combination of claim 1 wherein a retarder activating valve has means to move the bypass valve to closed position when the retarder is deactivated.

3. The combination of claim 1 wherein the fluid to the bypass circuit flows through said single valve to prevent actuation of the tractor brakes through the bypass circuit unless the trailer brakes are actuated.

4. In a tractor trailer combination in which the tractor and trailer have brakes and the tractor has a retarder all activated by fluid under pressure, a circuit including the tractor brakes, a circuit including the trailer brakes, a single pedal actuated valve controlling both said circuits to activate all of said brakes, a circuit including the retarder, a valve in the retarder circuit, means actuated by pressure in the retarder circuit when the retarder valve is open to close the tractor brake circuit, a bypass circuit to the tractor brakes, and a hand actuated bypass valve in said bypass circuit to control the tractor brakes, said bypass circuit communicating with the tractor brakes from a point downstream of said pedal actuated valve to prevent application of the tractor brakes through the bypass circuit unless the trailer brakes are applied.

5. The combination of claim 4 in which the retarder valve has a part engaging and closing the bypass valve when the retarder valve is closed.

No references cited.